United States Patent [19]
Kramer

[11] Patent Number: 5,902,182
[45] Date of Patent: May 11, 1999

[54] AIR EXCHANGE AND CLEANING SYSTEM FOR BUILDING ENCLOSURE, PARTICULARLY INDOOR FIRING RANGE

[75] Inventor: Karl E. Kramer, Arlington Heights, Ill.

[73] Assignee: WMA Ranger, Inc., Overland Park, Kans.

[21] Appl. No.: 08/779,057

[22] Filed: Jan. 6, 1997

Related U.S. Application Data

[63] Continuation of application No. 08/497,407, Jun. 30, 1995, abandoned.

[51] Int. Cl.⁶ .......................................................... F24F 3/16
[52] U.S. Cl. ................................ 454/255; 55/467; 55/318
[58] Field of Search ............................... 55/315, 318, 274, 55/467, 485; 454/255, 238

[56] References Cited

U.S. PATENT DOCUMENTS

| | | | |
|---|---|---|---|
| 3,936,284 | 2/1976 | Mason | 55/274 |
| 4,114,521 | 9/1978 | Busch | 454/188 |
| 4,164,901 | 8/1979 | Everett | 454/228 |
| 4,350,504 | 9/1982 | Diachuk | 55/274 X |
| 4,598,631 | 7/1986 | Everett . | |
| 4,604,111 | 8/1986 | Natale | 55/467 X |
| 4,838,910 | 6/1989 | Stollenwerk et al. . | |
| 5,074,894 | 12/1991 | Nelson . | |
| 5,099,751 | 3/1992 | Newman et al. | 454/238 |
| 5,205,783 | 4/1993 | Dieckert et al. | 454/238 |
| 5,360,372 | 11/1994 | Newman et al. | 454/253 |

FOREIGN PATENT DOCUMENTS 477512  12/1937  United Kingdom ................... 454/228

*Primary Examiner*—Harold Joyce
*Attorney, Agent, or Firm*—Wm. Bruce Day

[57] ABSTRACT

An air exchange and cleaning system for building enclosures, particularly indoor firing ranges, which removes particulate matter, such as lead and other heavy metals, and gun powder residues and gases from the enclosure atmosphere. An air handler unit includes a particulate matter separator and five stages of filtration which filter both powder and gases from the air. Ducts connect the air handler unit to the enclosed area of the building. The system includes a control system which starts the air handler unit, checks the status of the filters and other operating systems of the air handler unit and ensures that a required minimum negative pressure within the enclosure is achieved before signals are sent to permit operations within the enclosure. In the example of an indoor firing range, the air handler unit and duct system purges the range of possibly contaminated air, checks for satisfactory system operation and ensures a predetermined negative pressure is reached before turning on lighting to the range. When used for a firing range, the air inlet duct system is arranged to create an air wall within the interior of the range and at a position immediately downrange from the shooters' positions. A shooter can project his pistol bearing arm through the air wall while standing on the uprange side. Lead particles, unburned powder and gases are drawn away from the shooters' positions and routed through exhaust ducting to the air handler unit.

4 Claims, 3 Drawing Sheets

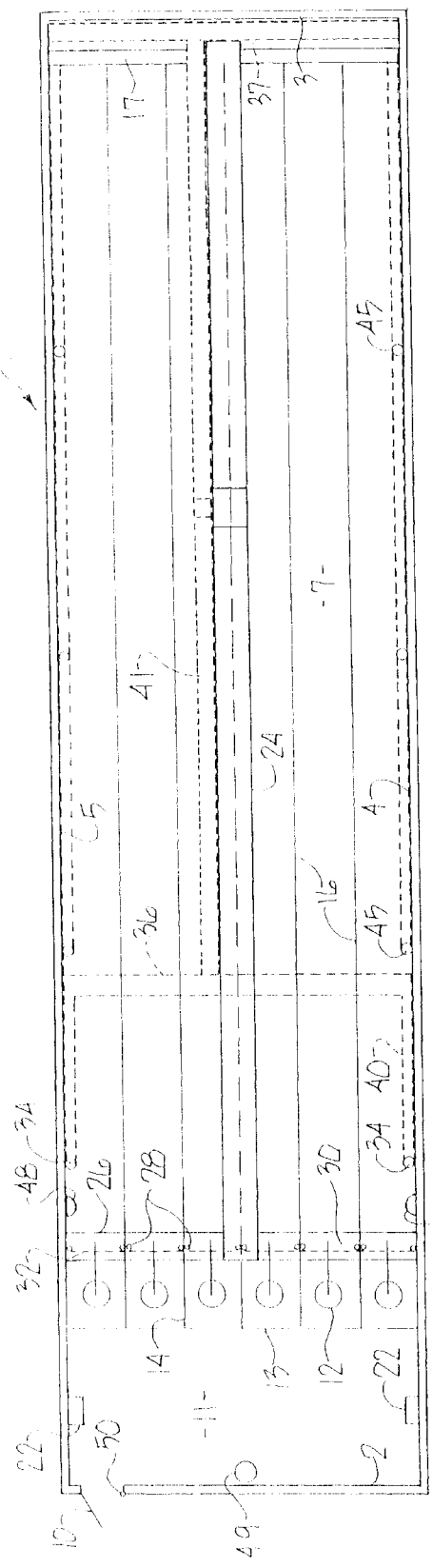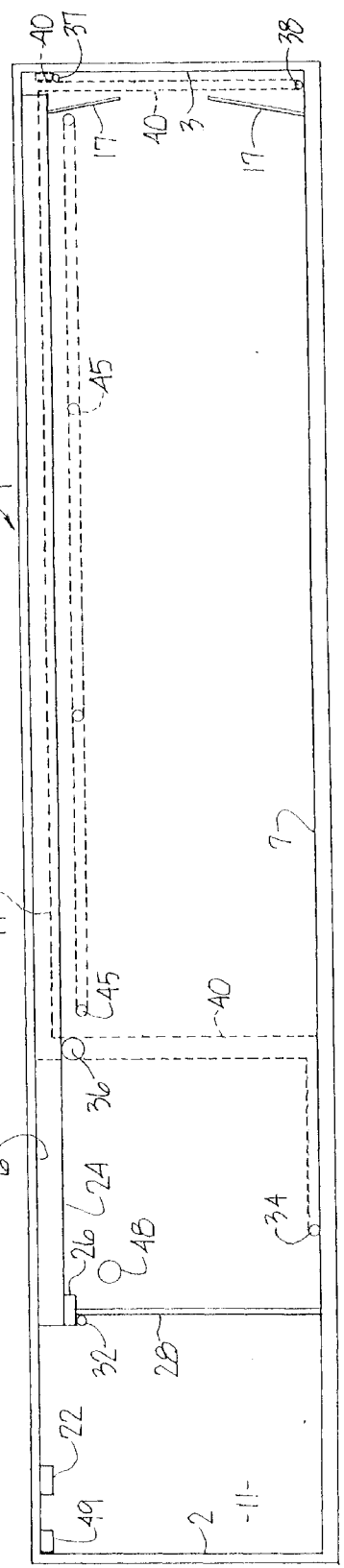

AIR EXCHANGE AND CLEANING SYSTEM FOR BUILDING ENCLOSURE, PARTICULARLY INDOOR FIRING RANGE

This application is a Division of Ser. No. 08/497,407 filed Jun 30, 1995 abandoned.

BACKGROUND OF THE INVENTION

The present invention relates to an air filtration and cleaning system for enclosures and more particularly to such a system particularly adapted for indoor gun firing ranges. Indoor gun firing ranges present particular problems for indoor air quality as well as the quality of air exhausted to ambient outdoor air. Standards for lead exposure and air quality have been developed by the Occupational Safety and Health Administration (OSHA) and the Environmental Protection Agency (EPA) as well as state and local air quality and environmental protection authorities. Laws and regulations have been established which present new compliance requirements and difficulties for owners and operators of such indoor range facilities. These standards provide specific guidelines to ensure that contaminants present in indoor firing ranges are properly controlled to ensure the safety of the shooter, employee and other persons who may be present within the range area. Further, the standards provide specific guidelines to ensure that contaminated air is not discharged into the atmosphere, but that contaminant levels are reduced to minimally acceptable levels. Indoor gun ranges present particularly difficult problems, because, as noted in U.S. Pat. No. 4,164,901, the following chemical elements are released into the atmosphere: boron, sodium, aluminum, silicon, phosphorus, sulphur, chlorine, potassium, calcium, titanium, chromium, manganese, iron, nickel, copper, zinc, arsenic, selenium, silver, cadmium, antimony, telrium, mercury, thallium, bismuth, lead solids and lead oxides as well as unburned gun powder and carbon monoxide gas. Certain of these elements are toxic, and continued exposure to them, as by a range employee, may lead to health problems or even death. Moreover, these contaminants cannot be released safely into the outside air.

Most existing indoor gun ranges have poorly designed ventilation systems, and either no or limited filtration such that at the present time few, if any, ranges comply with existing clean air standards. While Clean Air Act administrators on federal, state and local levels have not heretofore been active in ensuring compliance by gun range operators, administrators have been advising the operators that compliance will be necessary and monitored.

Additionally, the same or similar conditions which contaminate the air in gun ranges are also present with respect to other industrial processes. For example, metal plating operations are well recognized sources of contaminated air, as are radiator repair and other lead uses, including certain flux cleaning operations such as in the production of printed circuit boards and other electronic operations. Other industries or practices which produce contaminated air include biochemical operations or medical laboratories. Some such operations employ a "clean room" technique which circulates air through filters and which maintain a slight overpressure within an enclosed area. Greater than ambient pressure, or overpressure, is particularly hazardous when contaminants are involved, because overpressure within an enclosed area forces contaminants out of the room rather than creating a negative or underpressure within the room which would pull outside air in.

Others have attempted to respond to the problem of contaminated air within an indoor firing range by employing various air duct systems and filtration methods. For example, U.S. Pat. No. 4,164,901, assigned to American Air Filter Company, Inc., is directed to an indoor gun firing range enclosure for removing contaminants from the air, but still exhausts 80% of the air volume of the indoor chamber to the outside after being filtered. The method of filtration is such that filtration is arguably incomplete and would fail to meet current Clean Air Act standards. Older systems are also energy inefficient. Additionally, the system described in the '901 patent pulls air from one end of the range to the downrange end so that the shooter is constantly standing in an uncomfortable draft. The practice disclosed in the '901 patent demonstrates the problems of providing a safe, clean and comfortable environment for the shooter which can be in conflict with the necessity to comply with Clean Air Act standards.

SUMMARY OF THE INVENTION

The present invention is directed to several different levels: (1) an indoor firing range developed for the comfort of the user by providing an air wall immediately downrange of the shooter's position and through which the shooter extends his hand or gun barrel and from which contaminated air is drawn to a downrange end and various other exhaust outlets located within the range; (2) an air handler unit and blower arrangement which includes five stages of filtration which achieves at least 99.97 filtration at 0.3 microns; and (3) an electrical safety and sequencing system which controls and regulates purging of the enclosure, proper operation of the air handler unit, and signaling to the user of either safe or unsafe conditions.

While the invention has been developed for use for indoor firing ranges, broader application of the air handler unit and interoperational electrical safety and operating system is seen for control of other potentially contaminated work areas. While the existing system is designed and intended to ensure compliance with Clean Air Act standards for indoor ranges, other enclosures for different types of industries or activities may present their own hazards, leading to particularization of the present invention for those uses.

BRIEF DESCRIPTION OF THE DRAWINGS

The following drawings illustrate an exemplary embodiment of the present invention and are not to be taken as limiting or as illustrative of the sole embodiment by which the present invention can be practiced.

FIG. 1 is a plan view of a schematic representation of an indoor firing range enclosure embodying the present invention.

FIG. 2 is a longitudinal elevational view of an indoor gun range.

DETAILED DESCRIPTION OF THE PREFERRED EMBODIMENT

Figure 4:
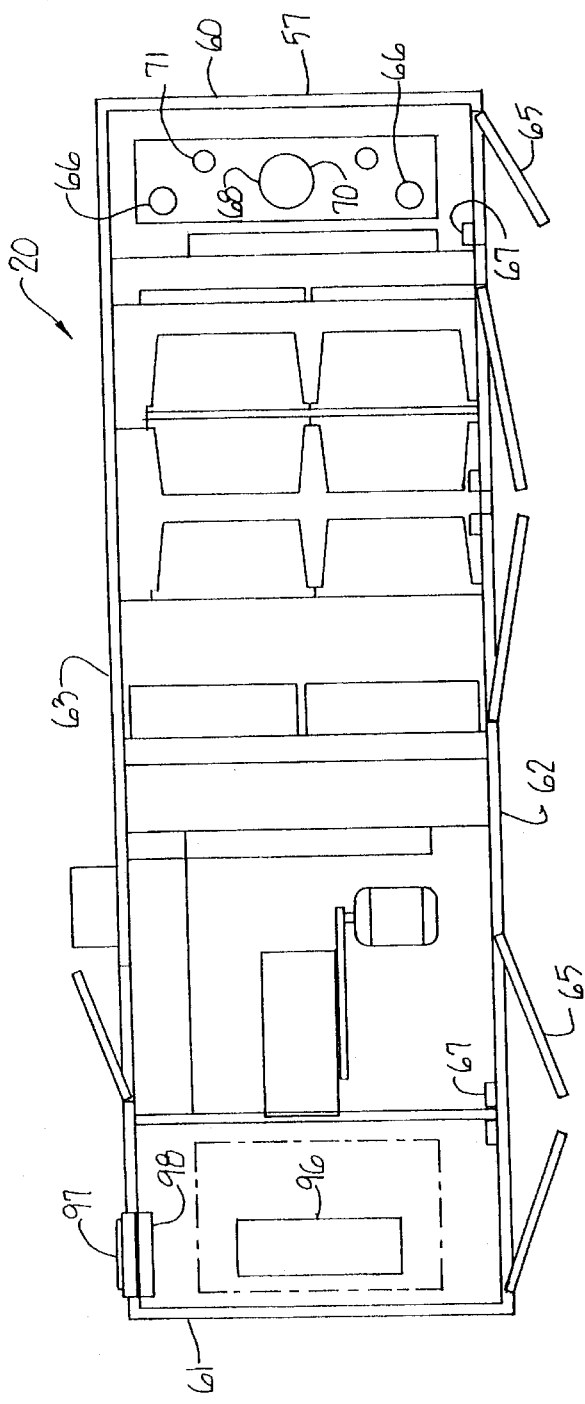
FIG. 4 is a plan view of the air handler unit and showing the roof removed for purposes of illustration.

Referring first to FIGS. 1 and 2, the referenced numeral 1 generally designates an indoor firing range comprising an enclosure having an uprange end wall 2, a downrange end-wall 3, spaced, parallel side walls 4 and 5, a ceiling 6 and a floor 7.

In a firing range, the uprange end is where the shooters stand and typically includes a door 10 leading into a ready room 11 for shooters' equipment and has a position for an instructor, a plurality of shooters' positions 12 commonly called "points", the shooters' positions 12 separated from the ready room 11 by a painted line 13 on the floor. Typically, there is a wall enclosure 14 on each side of the individual shooters' positions 12 which helps to shield the shooters against side spray of unburned gun powder and serves to muffle the muzzle blast.

Lanes 16 can be marked by painted lines on the floor 7 and extend from the shooters' positions 12 to the downrange end wall 3. The downrange end wall 3 is the target location and typically has a bullet trap 17 to capture the bullets fired from the uprange end. Also typically, an overhead trolley system (not shown) carries targets (not shown) from downrange locations back and forth to the shooters' positions 12 for inspection and changing.

As described above, gun firing generates small particles of bullet material, predominantly lead and lead oxides, and quantities of unburned or partially burned gun powder and combustion gases into the air. These are exhausted from the indoor firing range 1 and are cleaned and recirculated by the air handler unit 20, FIGS. 3 and 4. The range 1 includes a system of air supply ducts and air exhaust ducts, described below, connected with the air handler unit 20 to clean and replenish the air within the range 1. There are numerous safety devices and a start/purge sequence of initial operation to ensure cleanliness of the air within the range 1. Additionally, there are smoke and CO gas detectors 22 mounted on the walls of the ready room 11.

Figure 3:
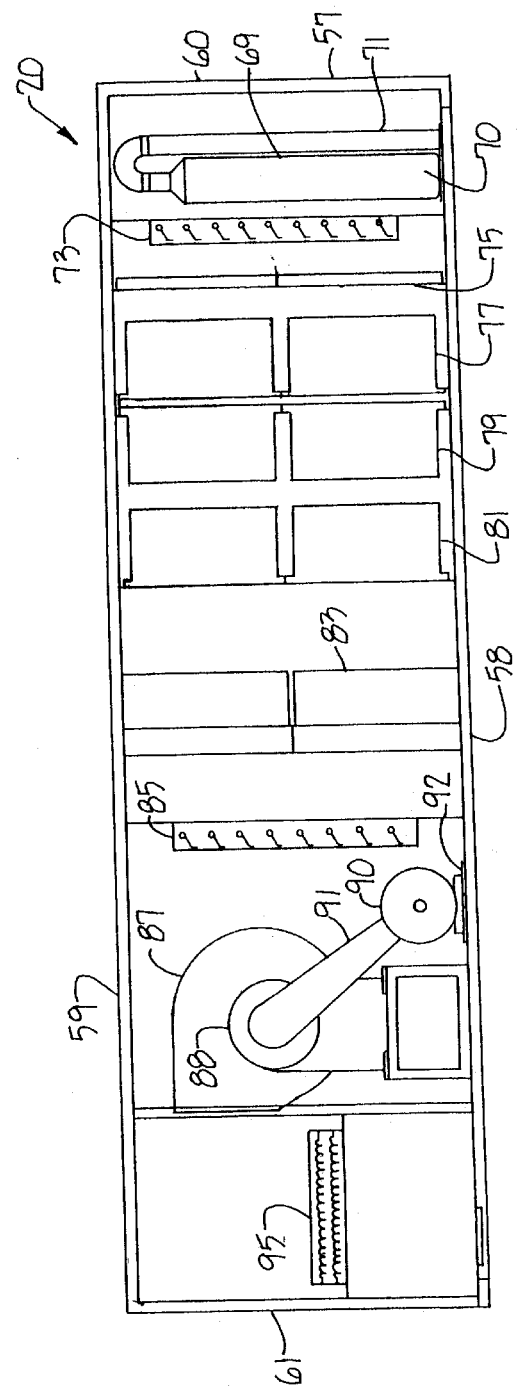
FIG. 3 is a longitudinal elevational view of the air handler unit and showing a side wall removed for purposes of illustration.

The air handler unit 20, FIGS. 2 and 3, is generally mounted on the roof of the indoor firing range 1 at a location variable with each installation. From the air handler unit 20, air is directed into the indoor firing range 1 via a main supply duct 24 which generally runs medially lengthwise of the indoor firing range 1. For a typical 75-foot-long range, the main supply duct 24 is generally 8"×24". Air from the main supply duct 24 is routed to a ceiling discharge duct 26 which is typically 8"×16" in dimension. From the ceiling discharge duct 26, all recirculated and filtered air enters the range via a plurality of vertical discharge pipes 28 which form pairs on opposite sides of each of the shooters' positions 12 so that there is a pair of the vertical discharge pipes 28 within each of the shooters' positions 12 defined by the wall enclosures 14. The vertical discharge pipes 28 are preferably 4" diameter PVC pipe perforated along their lengths so as to create a wall of air, or "air wall" at each one of the shooters' positions 12. Each air wall 30 is created immediately downrange of the shooters' positions 12 so that the rifle or pistol used by the shooter projects through the air wall 30. The shooter stands on one side of the air wall, and the gun is discharged on the downrange side of the air wall 30 so as to whisk away powder and gas residue from the firing. The extreme outside vertical discharge pipes 28 are perforated along their entire length toward the sidewalls 4 and 5 so as to sweep the sidewalls with air. Also at the location of the air wall 30 is a ceiling mounted make-up air supply duct 32, preferably of 6" PVC pipe which is perforated along its length, to provide make-up air as explained further below.

As mentioned above, all air entering the range is supplied at the air wall 30. To pull contaminated air from the range 1, a plurality of exhaust or vacuum return lines are provided.

In the illustrated example, upon exiting at the air wall 30, the air is contaminated at the firing line and is first removed by floor level suction lines 34 preferably of 3" PVC pipe and located five feet from the firing line. A pair of floor level suction lines 34 are mounted against opposite side walls 4 and 5. The floor level suction lines 34 remove the heavy end particulate matter and debris from the firing range floor. Approximately 13% of the range air is removed by the floor level suction lines 34 and divided between the two floor level return inlets. A ceiling return suction pipe 36, preferably of 8" PVC pipe perforated along its length, is located approximately 15 feet downrange and at approximately eight feet above the floor of the range. It extends across the width of the parallel walls 4 and 5 of the range and remove approximately 57% of the range air. Adjacent the downrange end wall 3 are located pit area return suction lines 37 and 38 consisting of a ceiling return line and a floor return line. Each of these are 4" PVC pipe perforated along the lengths and extending between the side walls 4 and 5. These lines are preferably protected from damage from projectiles by the use of baffles (not shown). The pit area return suction lines 37 and 38 return 30% of the range air to the main air handler unit 20, essentially divided equally between the ceiling return suction line 37 and the floor return suction line 38 and 15% each. Balance valves in each of the suction lines 37 and 38 are provided for balancing and regulation of flow in the lines. The floor level suction lines 34, ceiling return suction pipe 36 and ceiling and floor pit area return suction lines 37 and 38 are connected via lines 40 to a main return air duct 41 which returns to the air handler unit 20.

The indoor firing range 1 may also include central vacuum cleaning system inlets 45 connected to a central vacuum cleaning system and canister arrangement mounted within the air handler unit 20 for cleaning the range 1. Additionally within the range 1 are motion detectors 48 and an audible alarm 49 which is located above the ready room 11 and signals if the downrange area has been entered. Further, the door 10 to the ready room 11 has a contact switch 50 which, when opened, also sends an on signal to the audible alarm 49. Opening the door 10 during firing disturbs the air flow within the firing range 1 and allows smoke to be pulled uprange, rather than downrange.

The main air handler unit 20, FIGS. 3 and 4, is a filter and blower system enclosed within an elongate, sturdy metal frame construction cabinet consisting of a roof curb flashing floor 58 designed to the specification of each installation. The main air handler unit 20 has a bonded protective rubber membrane roof 59, opposite ends 60 and 61 and parallel sides 62 and 63. Preferably the floor, roof, end and side panels are of 18-gauge galvanized metal with 14-gauge square tube frame construction and rigid insulation throughout. The unit 20 is of double-wall construction and without exposed insulation. A plurality of access doors 65 extend through the side walls 62 and 63 and are secured closed to the side walls by key locks (not shown). Door interlock switches 67 detect door opened or closed conditions and prevent the unit 20 from operating if a door is open unless an override button 116 is depressed. The end 60 is the inlet end, and the end 61 is the outlet end, the air being moved through the air handler unit 20 by a blower as hereafter described.

Moving from right to left in FIGS. 3 and 4, contaminated air enters the air handler unit 20 through a main intake line 68 and two pit suction lines 66 at the inlet end 60. If the unit 20 is optionally so equipped, contaminated range air is also drawn into the unit 20 through a vacuum collector 69 which consists of a collector bag 70 and a pickup tube arrangement 71. The vacuum collector 69 receives visible particles and particulate matter from the contaminated air, commonly lead particles. The vacuum collector 69 is connected to the system inlets 45 via vacuum conduits 72 which are routed along the range floor and then upwardly to join the pickup tube 71 in the unit 20. Airflow moving through the unit 20 is sufficiently strong to pull air through the inlets 45 and conduits 72 and create the vacuum effect. The collector bag 70 is porous to pass suctioned air therethrough and trap particulate matter, such as lead and bullet fragments. All air next passes through a gravity damper 73, such as sized 36" by 36". The air next passes through a five-stage filter arrangement, the first of which is a pre-filter 75 with a filter media which provides filtration at 26% efficiency. This is typically a 2" filter. The next stage of filtration is the Stage 2 filter 77, which in the illustrated example is a Luwa filter, providing filtration at 75% ASHRAE.

The third Stage filter 79 is an activated carbon gas phase filter which absorbs gases.

The Stage 4 filter 81 is a Luwa filter providing filtration at 98% ASHRAE, and the final or Stage 5 filter 83 is a HEPA filter providing filtration of no less than 99.97% minimum efficiency at 0.3 microns. The filtration section is closed by a gravity damper 85 separating the filter units from the blower next downstream. The gravity damper 85, like the gravity damper 73, is preferably 36"×36". Isolating the filtration stages by the dampers 73 and 85 protects the gas phase filter, the Stage 3 filter 79, from adsorption of gases other than those intended and isolates all of the five stages of filters from the atmosphere when the unit is not running.

The blower unit 87 is mounted downstream of the second gravity damper 85 and includes a backward incline high static pressure fan 88 capable of moving 3,000 CFM at 9" water column, total static pressure. The motor 90 is selected for size based on the needs of the particular installation with a minimum requirement of 7.5 horsepower. The motor 90 drives the fan 88 via a belt drive system covered by a protective and perforated sound deadening shield 91. Rubber isolator pads 92 provide isolation mountings between the components of the blower unit 87 and the captain mountings. Downstream of the blower unit 87 is an optional heater coil 95 which tempers air entering the range 1. Preferably the preheat coil is a 0° to 50° at 5,000 CFM electric heater. Below the heater coil 95 is the outlet or return duct 96 connecting to the range main supply duct 24. Above and to the side of the heater coil 95 is a gravity backdraft damper 97 located exteriorly of the unit 20 and communicating with the unit interior through a hole in the sidewall 63. An air foil exhaust damper 98 is on the inside surface of the hole and has interior vanes which close in the absence of outwardly exhausting airflow. Both dampers 97 and 98 are, in the present example, 6"×12" and are regulated to discharge 1200 CFM air from the unit 20, which air is made up within the pressurized range by a make-up air system, hereinafter described. The combination of blower capability, size of unit 20 and size of range 1 are selected to preferably maintain an airflow of 2400 CFM at 4" water pressure into the range, calculated for a 6 point, or 6 shooter's, position range. It is desired to attain and maintain 200 CFM airflow per shooter. The dampers 97 and 98 are selected in size and flow through characteristics to maintain a unit internal airflow of approximately 2400 CFM while exhausting approximately 1200 CFM.

Figure 5:
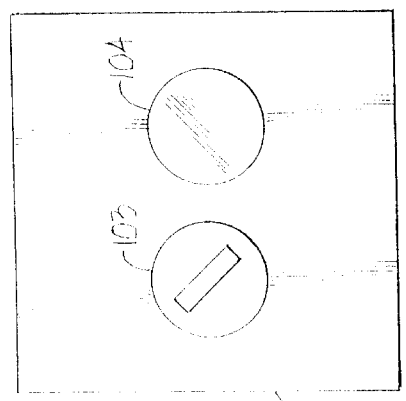
FIG. 5 is an elevational view of the main control unit.
Figure 7:
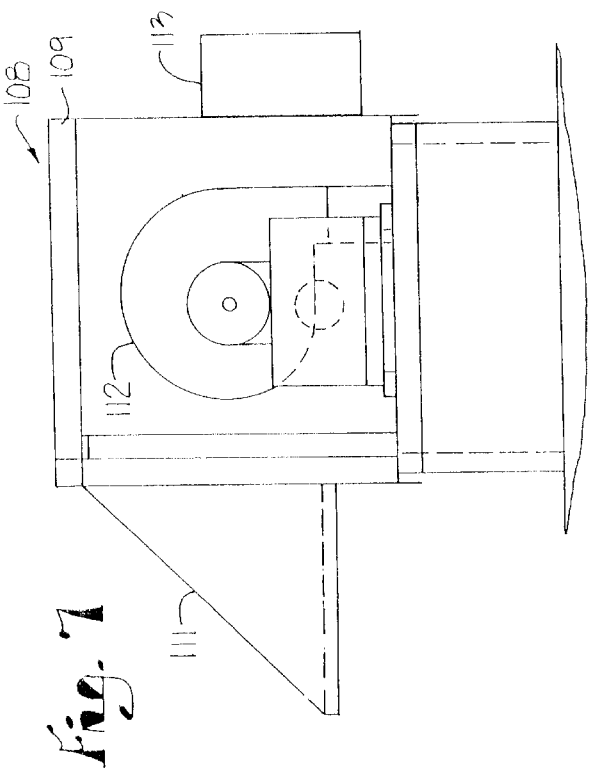
FIG. 7 is a side elevational view of a make-up air unit with a sidewall removed for purposes of illustration.

The access doors 65 are conveniently located around the cabinet 57 to provide access to all the components located therein including maintenance operations and changing of filter elements. The door interlock switches 67 prevent circuit completion when an access door 65 is open and provides such indication to a main air handler control panel 100, FIG. 6, as set forth below. FIG. 5 illustrates a firing range control switch 102 which is mounted outside of the firing range 1, such as adjacent the door 10 and in a suitable junction box. The firing range main switch 102 includes only a main control toggle switch 103 to turn the air handler unit 20 on or off and a service required light 104 which illuminates to indicate required service. If the service required light 104 illuminates after turning on the main control toggle switch 103, the air handler unit 20 will start and run approximately 120 seconds, then shut all systems and lighting down, illuminating the service required light. At that point, a service technician inspects the air handler unit 20 by referring to the main air handler control panel 100 mounted on or adjacent to the air handler unit 20. The components of the panel 100 are best described by reference to the operation of the main air handler unit 100. To initiate range startup, the operator activates the main control toggle switch 103 located in the firing range main switch junction box 102. This activation sends a signal to a make-up air unit 108, which is normally mounted adjacent to the main unit 20. The make-up air unit 108 is connected into the make-up air supply duct 32 through a separate duct and substantially consists of an enclosure 109 containing an intake opening 111 open to ambient air and a blower motor 112. The blower motor 112 is preferably a one-horsepower motor which generates 800 cubic feet per minute at 1" static pressure. A junction box 113 mounted on the make-up air unit 108 contains starter and disconnect switches. A static pressure switch is normally mounted remotely in the make-up air supply duct 32 which signals when ½ water column pressure has been reached in the make-up air supply duct 32 leading from the make-up air unit 108 into the range 1.

Figure 6:
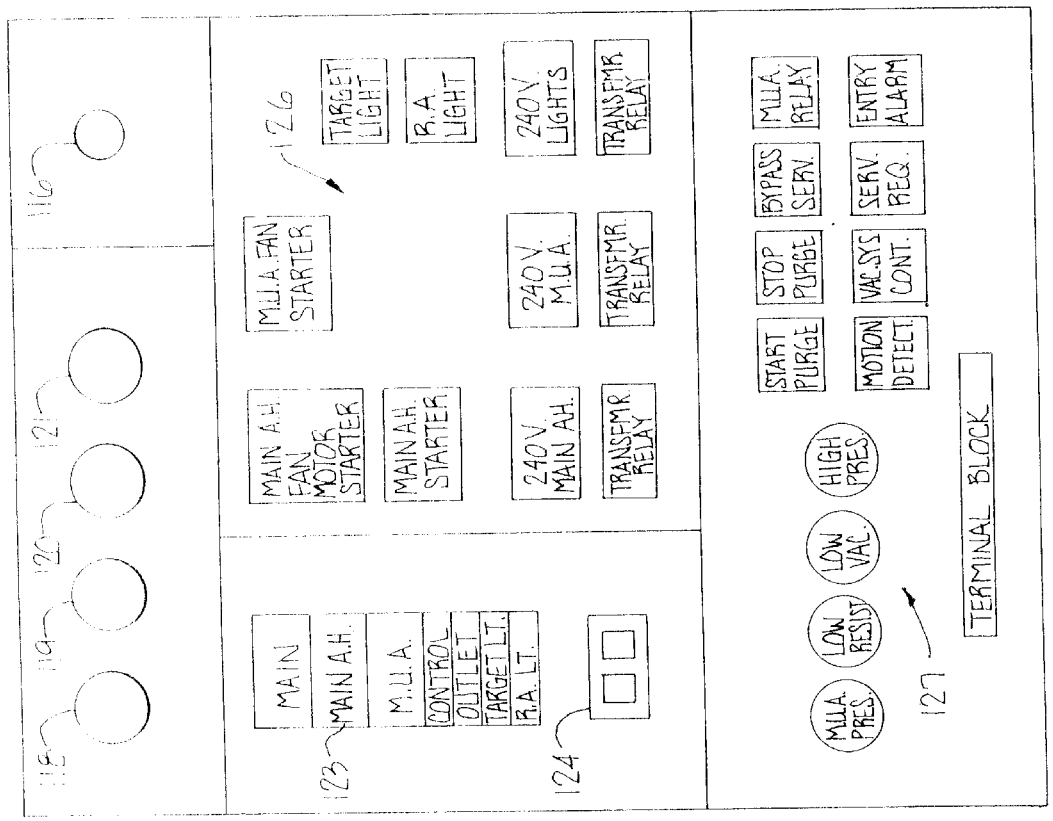
FIG. 6 is an elevational view of the main air handler control panel.

Activation of the main control toggle switch 103 sends a signal to the make-up air unit 108 which starts an injection of make-up air into the firing range 1. Upon establishing a pre-set amount of pressure, such as ½" water column pressure, in the make-up air supply duct 32, a signal is sent to the main air handler unit 20 which then undergoes a startup and self-test sequence to ensure that it is operating properly and filtering potentially contaminated air as designed. When the static pressure switch of the make-up air unit 108 signals that the required static pressure has been achieved, a start signal is sent to the main air handler unit 20 which then enters a purge cycle. The purge cycle continues for a pre-set period of time, such as 300 seconds, after which a signal is sent to lighting controls within the range 1 to illuminate the range so that it can be used. To ensure that there is no unknown penetration of the range 1, the downrange motion detector system 48 is active both during the purge cycle and normal operation of the main air handler control panel 100. In the event the startup or purge cycle is not successful, as noted by failure to operate the static pressure switches within the junction box 113, an alarm signal will be sent to the service required light 104 on the firing range main switch 102, and range lighting will fail to illuminate. Adverse conditions noted by the static pressure switches are indicated by a low air resistance indicator switch 129, a low vacuum lockout indicator light 130 and a high pressure lockout indicator switch 131. Failure to start will occur if any sensing device fails to sense normal operation. Failure could be caused by a number of different modes, including blower motor failure, open access doors, clogged filters and the like. Startup failures require the operator to go to the main air handler control panel 100. The main air handler control panel 100 includes a manual override test switch and filter gauges including gauge 118 for the first stage filter, gauge 119 for the second stage filter, gauge 120 for the third and fourth stages of filters and gauge 121 for the fifth stage filter. A plurality of circuit breakers 123 are presented in the control panel 100, as is a 110-volt service outlet 124. Either within the control panel or in a separate control panel is a high voltage area 126 containing a plurality of relays as shown in FIG. 6, or the high voltage area can be in a separate junction box. The same is true for a low voltage area 127, also containing a plurality of relays and switches, including the indicator lights 129, 130 and 131. Preferably the high and low voltage areas 126 and 127 are separated by metal partitions, if not being in separate junction boxes.

Startup failures require operator initiation of the manual override test switch 116 in order to bypass the safety system, which allows the main air handler 20 to run momentarily, assuming that all access doors are closed. When the operator depresses and holds the manual override test switch 116, a visual diagnosis can be made to determine service needs. The filtration product condition indicating gauges 118 through 121 can be viewed to determine if filters are full and stopping air flow. When the manual reset controls 117 are tripped, the system shuts down, and required service can be performed by unlocking the access doors to the blower units and filters. Full system startup cannot be initiated until the service has been performed and access doors secured. The purge sequence may be restarted by turning the main control toggle switch 103 momentarily and then returning it to the run position. The purge sequence and self-test cycle will be reactivated. In the preferred embodiment, range lights will not illuminate until the purge cycle has been successfully completed. Further, the range entrance door 10 is to be kept closed so that the enclosure may be purged of any contaminated air. A door alarm signal will sound if the door is opened during the purge cycle. The alarm circuit deactivates when the purge cycle is successfully completed.

At full operating efficiency, the air handler unit 20 provides eight to nine thousand feet per minute airflow in the return line at a pressure of four to five inches of water column. This is a significantly higher pressure than previous known systems. As an example and for background, 1,000 to 2,500 feet per minute is a normal airflow in an air circulation system. At 2,000 to 2,500 feet per minute airflow, sand can be conveyed. Lead particles are not conveyed until airflow reaches 3,000 to 4,000 cubic feet per minute of airflow. At 8,000 to 9,000 feet per minute in the return line, as in the present system, airflow remains sufficiently strong to quickly convey contaminants, lead particles and gases.

Although the above ventilation and air cleaning system has been illustrated and described in connection with an indoor firing range, its use is not so limited, and it is foreseen that the arrangement could be beneficially employed in conjunction with other situations, including industrial situations requiring filtration of contaminated air and evacuation of particulate matter in compliance with EPA, OSHA or other applicable regulations.

The foregoing description is given primarily for illustrative purposes and to describe a preferred embodiment of the invention. However, modifications may be obvious to those skilled in the art upon reading this disclosure and may be made without departing from the spirit of the invention or the scope of the following claims.

What is claimed and desired to be secured as Letters Patent is as follows:

1. An air control filtration unit and system for maintaining filtered and pressurized air within a building enclosure and comprising:

a) means for electrical control of said filtration unit including a start switch, means for directing an initial stream of external make-up air into a building enclosure, means for establishing a pre-determined positive air pressure within said enclosure, means for signaling an air cleaner and blower unit components of said air control unit in order to maintain said pre-determined positive air pressure, means for safety self-test of said air control unit including testing of filtration stages, and having means for providing information to a controller concerning said filtration stages;

b) an enclosed housing of substantially airtight construction and having an air inlet end for admission of contaminated air from said building enclosures and an air outlet for exhausting cleaned air into said building enclosure;

c) five stages of filtration mounted within said housing and including sequentially from said air inlet end to said air outlet end;
      (1) stage 1 comprising a prefilter having an efficiency in the order of 26% [ASHRAE 52-92.1];
      (2) stage 2 comprising a filter having an efficiency in the order of 75% [ASHRAE 52-92.1];
      (3) stage 3 comprising an activated carbon gas phase filter for removal of odors and smoke;
      (4) stage 4 comprising a filter having an efficiency in the order of 98% [ASHRAE 52-92.1]; and
      (5) stage 5 comprising a HEPA filter having an efficiency in the order of 99.9% filtration at 0.3 microns;

c) said five stages of filtration resulting in filtered air that is substantially contaminate free;

d) isolation dampers mounted within said housing and generally at said inlet and outlet ends of said stages of filtration for closing said housing off from said building enclosure during non-operational periods; and e) a fan for moving air through the housing and said stages of filtration.

2. The air filtration unit set forth in claim 1 wherein said fan maintains approximately five to nine inches of water column total static pressure within said housing.

3. An air filtration unit and control system for maintaining filtered and pressurized air within a building enclosure and comprising:

a) an enclosed housing of substantially airtight construction and having an air inlet end for admission of contaminated air from said building enclosure and an air outlet end for exhausting cleaned air into said building enclosure;

b) multiple stages of filtration mounted within said housing and including sequential stages providing increasing fineness of filtering;

c) a fan for moving air through said housing and said stages of filtration;

d) a controller including means for electrical control including a start switch, means for directing a stream of external make-up air into an enclosure, means for establishing a predetermined positive air pressure within said enclosure, means for signaling an air cleaner and blower unit components of said air control unit in order to maintain said predetermined positive air pressure and means for safety self-test of said air control unit including testing of filtration stages;

e) filter sensor means for each of said stages of filtration for signaling the condition of said stages to said controller;

f) access doors in said housing and door sensor means for signaling the status of said doors to said controller; and g) stop means for stopping operation of said fan upon receipt of signals to said controller from said filter sensor means indicating a full condition and from said door sensor means indicating an open door.

4. An air control and filtration unit and controller system for maintaining filtered and pressurized air within a building enclosure and comprising:

a) a controller and control system including electrical control means for start up of said filtration unit, duct means for directing an initial stream of external make up air into a building enclosure, pressure sensing means for establishing a predetermined positive air pressure within said enclosure, means for signaling an air cleaner and blower unit components of said air control and filtration unit in order to maintain said predetermined positive air pressure in order to maintain said predetermined positive air pressure, means for safety self-test of said air control unit including testing of filtration stages and having means for providing information to a controller concerning said filtration stages;

b) an enclosed housing of substantially airtight construction and having an air inlet end for admission of contaminated air from said building enclosure and an air outlet for exhausting cleaned air into said building enclosure;

c) five stages of filtration mounted within said housing and including sequentially from said air inlet end to said air outlet end;
  (1) stage 1 comprising a prefilter having an efficiency in the order of 26%;
  (2) stage 2 comprising a filter having an efficiency in the order of 75%;
  (3) stage 3 comprising an activated carbon gas phase filter for removal of odors and smoke;
  (4) stage 4 comprising a filter having an efficiency in the order of 98%; and
  (5) stage 5 comprising a HEPA filter having an efficiency in the order of 99.9% filtration at 0.3 microns;

c) said five stages of filtration resulting in filtered air that is substantially contaminate free;

d) isolation dampers mounted within said housing and generally at said inlet and outlet ends of said stages of filtration for closing said housing off from said building enclosure during non-operational periods; and e) a fan for moving air through the housing and said stages of filtration.

* * * * *